US008237787B2

(12) United States Patent
Hollinger

(10) Patent No.: US 8,237,787 B2
(45) Date of Patent: Aug. 7, 2012

(54) BALL WITH CAMERA AND TRAJECTORY CONTROL FOR RECONNAISSANCE OR RECREATION

(75) Inventor: Steven J. Hollinger, Boston, MA (US)

(73) Assignee: Steven J. Hollinger, Boston, MA (US)

( * ) Notice: Subject to any disclaimer, the term of this patent is extended or adjusted under 35 U.S.C. 154(b) by 256 days.

(21) Appl. No.: 12/772,198

(22) Filed: May 1, 2010

(65) Prior Publication Data

US 2010/0277617 A1   Nov. 4, 2010

Related U.S. Application Data

(60) Provisional application No. 61/174,994, filed on May 2, 2009, provisional application No. 61/177,769, filed on May 13, 2009, provisional application No. 61/226,618, filed on Jul. 17, 2009.

(51) Int. Cl.
*H04N 5/253* (2006.01)
*H04N 7/18* (2006.01)
*H04N 5/225* (2006.01)

(52) U.S. Cl. .......... 348/82; 348/151; 348/158; 348/375; 348/376

(58) Field of Classification Search ..................... 348/82, 348/143, 144, 151, 158, 208.4, 208.6, 373–376
See application file for complete search history.

(56) References Cited

U.S. PATENT DOCUMENTS

| | | | | |
|---|---|---|---|---|
| 5,045,871 | A | * | 9/1991 | Reinholdson ..................... 396/6 |
| 6,924,838 | B1 | * | 8/2005 | Nieves ..................... 348/211.99 |
| 7,030,929 | B2 | * | 4/2006 | Chang et al. ................... 348/374 |
| 7,643,052 | B2 | * | 1/2010 | Gal et al. ....................... 348/36 |

(Continued)

FOREIGN PATENT DOCUMENTS

| | | |
|---|---|---|
| GB | 2407725 A | 8/2009 |
| GB | 2444391 B | 1/2012 |
| JP | 2001042420 | 2/2001 |

OTHER PUBLICATIONS http://www.imaging-resource.com/NEWS/1171318637.html
"SatuGO: The throwable (!) camera concept" published Feb. 12, 2007 by Michael R. Tomkins, The Imaging Resource.*
http://www.behance.net/Gallery/flee-digital-cam/106492.
Eschel Jacobsen Industriel Designer, www.satuGO.com.

*Primary Examiner* — Daniel M Pasiewicz
(74) *Attorney, Agent, or Firm* — Kurt Rauschenbach; Rauschenbach Patent Law Group, LLP

(57) ABSTRACT

A ball that provides normalized images of a ground-based target subject captured over the course of the arc of its airborne trajectory. The improvements include a processing unit that compiles multiple images into a smooth continuous fly-by video of the target subject, a processing unit that stitches multiple images captured at a single moment in the ball's trajectory into a panoramic image and further normalizes and compiles multiple panoramic images into a smooth, continuous fly-through video, and an embedded motion sensor to initiate operations when the ball is pitched, and an embedded impact sensor to shut down operations for power conservation, and a mass which forces the camera into a repeated spinning or precessing orbit around the core of the ball, and a wireless transmission of surveillance imagery captured by the ball, and ground-based transmission of the target subject's location for subsequent image capture, and means for capturing multiple images of varying viewpoints including a camera aperture connected to a branching collection of fused fiber optic bundles. Also disclosed are means for directing the ball along a controllable trajectory to move toward a ground-based target subject.

20 Claims, 7 Drawing Sheets

U.S. PATENT DOCUMENTS

| | | | |
|---|---|---|---|
| 7,733,416 B2 * | 6/2010 | Gal | 348/373 |
| 2004/0036770 A1 * | 2/2004 | Adams | 348/157 |
| 2009/0040308 A1 * | 2/2009 | Temovskiy | 348/158 |
| 2010/0066809 A1 * | 3/2010 | Cormack et al. | 348/36 |

* cited by examiner

FIG. 4
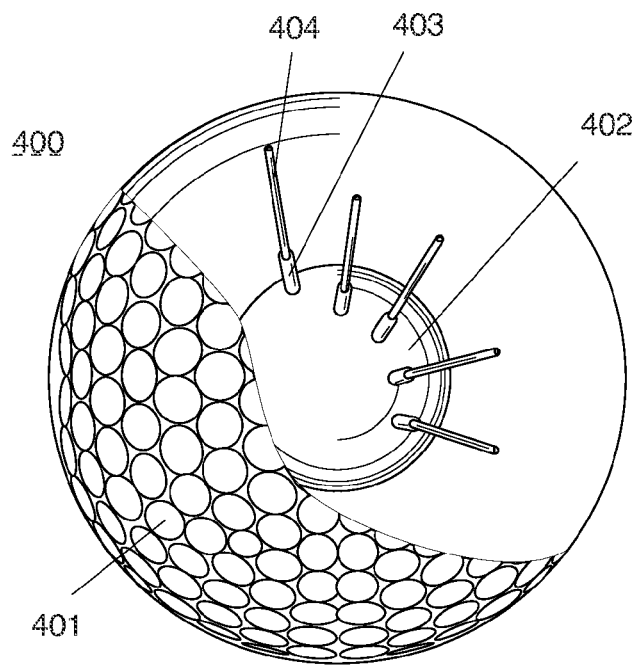
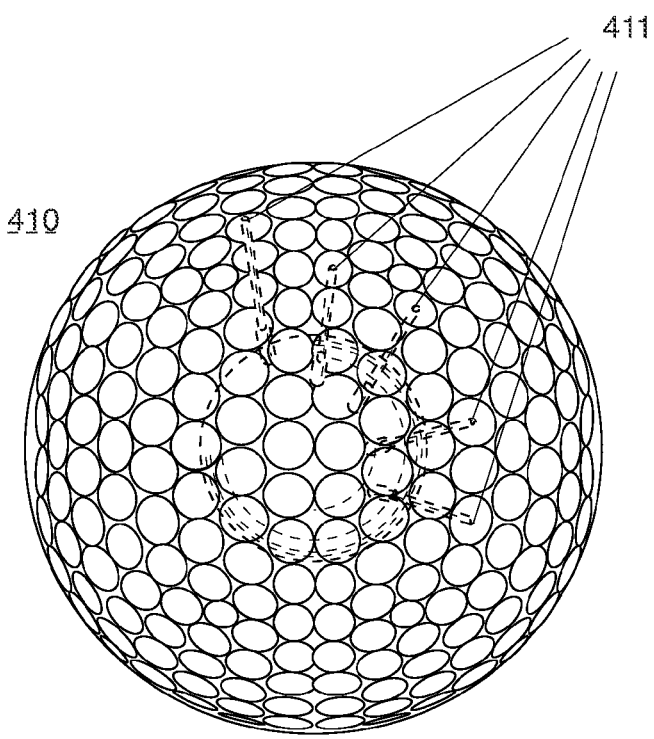

FIG. 6
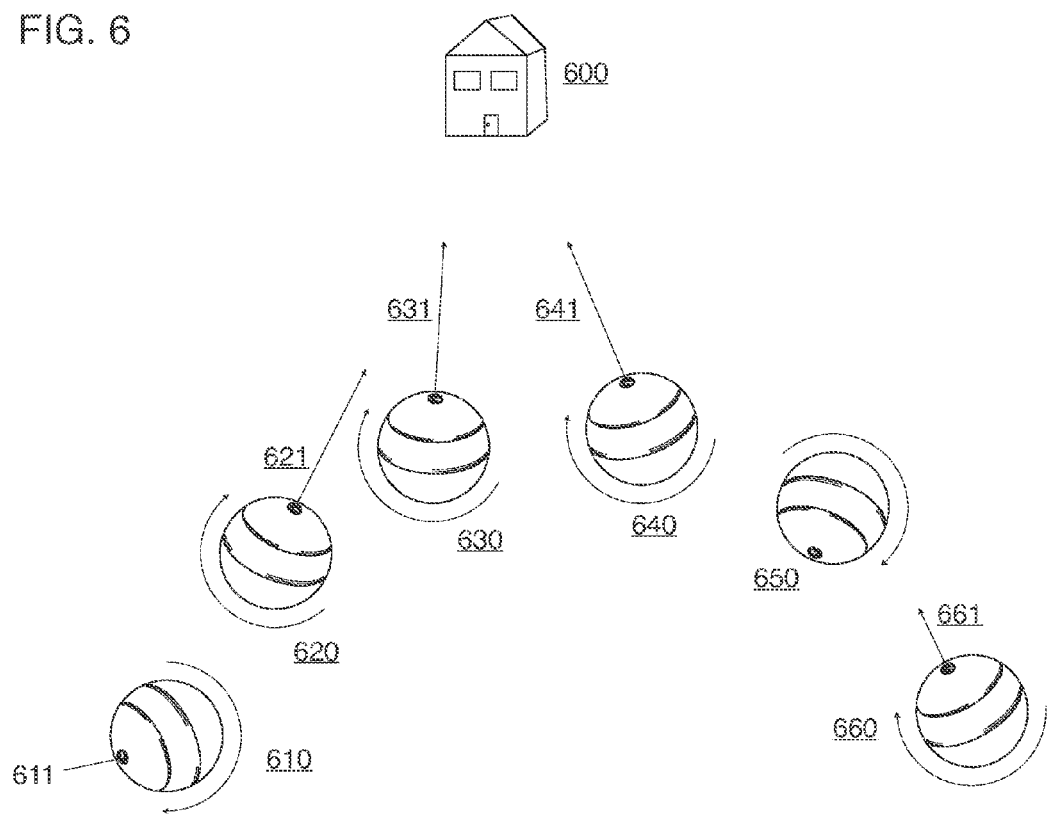
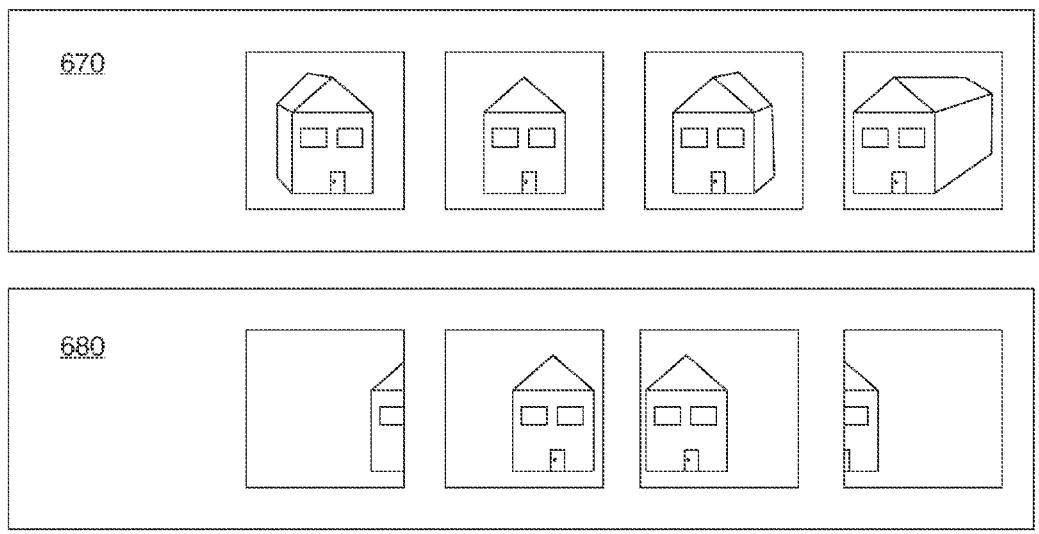

FIG. 7
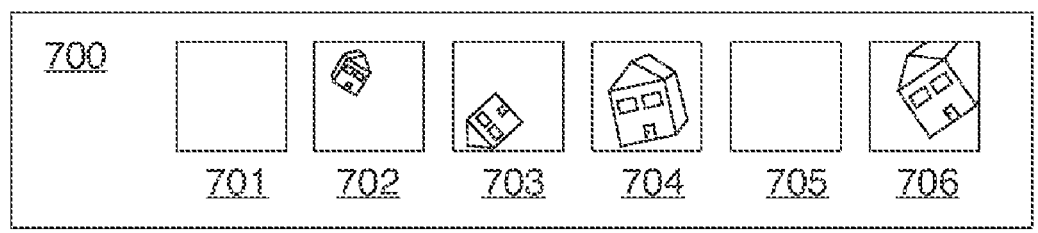
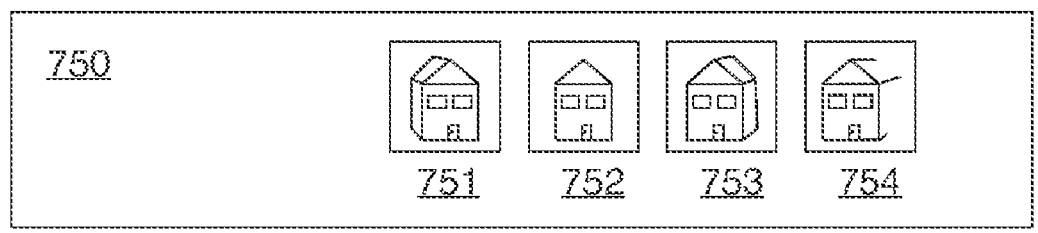

BALL WITH CAMERA AND TRAJECTORY CONTROL FOR RECONNAISSANCE OR RECREATION

CROSS-REFERENCE TO RELATED APPLICATIONS

The present application claims priority to U.S. Provisional Patent Application Ser. No. 61/174,994, filed May 2, 2009, and U.S. Provisional Patent Application Ser. No. 61/177,769, filed on May 13, 2009 and also, U.S. Provisional Patent Application Ser. No. 61/226,618, filed on Jul. 17, 2009. The entire contents of these applications are herein incorporated by reference.

STATEMENT REGARDING FEDERALLY SPONSORED RESEARCH DEVELOPMENT

Not applicable.

BACKGROUND OF THE INVENTION

1. Field of the Invention

The invention has generally to do with spherical projectiles capable of sensing their spatial location and orientation while in an airborne trajectory, and more particularly a ball capable of using location and orientation information to move towards and capture images of a particular ground-based subject of interest.

2. Description of Related Art

Projectiles with embedded cameras, including spherical ball-shaped cameras, exist in prior art with suggested uses for military surveillance, reconnaissance and general recreation.

Ball-shaped cameras with a 360-degree view around the circumference of the sphere exist in prior art.

The combination of a camera and a location-sensing unit, both embedded in a projectile, is taught in prior art. Conventional model rockets are equipped with a camera and sensor triggered by a change in the orientation of the rocket body at the apogee of its trajectory.

Great Britain patent GB2444391 teaches of a resilient object, which can be thrown or kicked, to a point of interest, capable of transmitting audio and video information captured by an embedded camera. The description of this resilient object teaches of the use of a GPS sensor and an orientation sensor to provide location information and orientation information, however no description is provided of how these sensors are used for a meaningful capture of image data while the object is airborne. This resilient object is further disadvantaged by its inability to change its own trajectory. The inflatable housing and cubic shape of the preferred embodiment present impractical aerodynamic impediments with respect to drag if a pitched or projected airborne trajectory is desired.

Great Britain patent GB2407725 (A) describes a camera mounted inside a ball. As with the resilient object of patent GB2444391, this ball is disadvantaged by its inability to store and analyze successive frames of captured image data. The ball is further disadvantaged by its inability to capture successive frames of image data captured while spinning or precessing past a ground-based subject in order to produce a meaningful video stream. This ball is further disadvantaged by its inability to change its own trajectory.

Japan patent JP2001042420 describes a camera mounted inside an impact-resistant ball. This patent is disadvantaged by requiring external surface-mounted fins to ensure that the camera provides images from a desirable orientation.

The "Flee" camera conceived by Turkish designer Hakan Bogazpinar at http://www.behance.net/hbogazpinar describes a camera mounted inside a ball that takes pictures at customizable time intervals. This patent is disadvantaged by requiring an external surface-mounted aerodynamic tail to ensure that the camera provides images from a desirable orientation.

The "Satugo" camera conceived by Danish designers Eschel Jacobsen and Mads Ny Larsen at http://www.satugo.com/ describes a camera mounted inside a ball that is triggered on impact with a fixed surface or at preset time intervals.

It is known in prior art, including in above references, that a ball can contain a camera that captures one image or multiple snapshots in the course of its trajectory. It is known in prior art, including in above references, that a ball can contain a camera that captures continuous video in the course of its trajectory. It is known in prior art, including in above references, that a ball can contain a camera that stores images, which can be uploaded for viewing on a computer when the ball is retrieved.

It is known in prior art, including in above references, that a ball can contain a camera with logic for controlling the capture of photographs or video for a preset duration, or based on preset intermittent time intervals over a portion of the course of its trajectory.

It is known in prior art, including in above references, that the camera's orientation relative to its external environment can be stabilized and controlled during flight by aerodynamic means, such as by attachment with a fixed pair of tailfins mounted on the outer housing.

It is known in prior art, including in above references, that a camera moving on an airborne trajectory may be triggered by an external signal from a transmitter.

It is known in prior art, including in above references, that a camera moving on an airborne trajectory may be triggered by a switch that senses impact with a solid object.

It is known in prior art that a camera contained within a housing can operate independent of the orientation of its own exterior housing, using mechanical gyroscopes or digital stabilization techniques. Such methods are employed in ordinary cell phones and digital cameras to remove jitter.

It is known in prior art that fixed perturbations on the exterior surface of a ball can alter the ball's aerodynamic profile. Dimples on a conventional golf ball such as shown in FIG. 1 improve performance by creating a thin unseparated boundary layer of turbulent air between the surface and the high-speed layer.

A golf ball dimple is of a critical size and contour so as to induce the creation of a thin layer of turbulence between the ball's exterior surface and a high-speed layer of moving air, with a goal of producing lift for the longest possible trajectory. A dimple with a fixed depth on a golf ball produces an optimal result for a single aerodynamic condition, and an acceptable sub-optimal result over a range of aerodynamic conditions. Golf ball dimples produce an undesirable drag at lower windspeeds.

Similarly, the rigid ridges on the upper surface of a Frisbee flying disc produce a desirable increase in lift over a significant portion of the disc's airborne trajectory, but produce an undesirable increase in drag at other portions of the disc's trajectory. The ridges are not physically changed in their size, number or shape during flight.

A conventional football is ellipsoid-shaped to eliminate bluff leading and trailing surfaces ordinarily associated with sphere-shaped projectiles, thus improving laminar flow from head to tail.

It is known in prior art that airborne projectiles can contain internal logic and mechanical systems that alter their own trajectories. For example, missiles may contain guidance systems and mechanical gyroscopes to control a flight path. It is known in prior art that airborne projectiles can contain external aerodynamic systems that alter their own trajectories. For example, missiles may contain electromechanical fins to control a flight path.

Recreational balls such as so-called goof-balls contain spring-mounted weights or other simple mechanisms to shift the center of lift while in flight, creating either a spiraling or a randomly shifting trajectory. Such balls are disadvantaged by an inability to purposefully control their trajectory.

BRIEF SUMMARY OF THE INVENTION

The object of the invention is achieved by a hand-held ball that, when thrown or projected into an airborne trajectory, senses its position and orientation to trigger an embedded camera with the purpose of capturing an image of a ground-based target subject, spatially transforms the captured image to a normal relative to the ground-plane, and provides the image to the ball's user.

In another aspect of the invention, the ball compiles multiple captured images into a video flyby of the ground-based target subject.

In another aspect of the invention, the ball's on-board processor stitches multiple images captured at a moment in the trajectory into a single panoramic view.

In another aspect of the invention, the ball's on-board processor compiles multiple panoramic views into a viewable fly-through of the environment through which the ball traveled.

In another aspect of the invention, the ball contains a sensor to detect when the ball is both at its apogee and in an earth-facing orientation such that the camera is capable of capturing an image of the ground-based target subject.

In other aspects of the invention, images captured in flight are stored in memory available in real-time to the ball's on-board processing unit, allowing the logic unit to apply knowledge gained from prior image captures to decisions regarding the triggering of successive image captures and trajectory changes.

In still other aspects of the invention, the ball's embedded camera is instructed by the ball's on-board logic unit to vary capture resolution, providing low-resolution images for internal real-time analysis in order to determine the appropriate moments in the ball's trajectory to capture high-resolution image information.

In a further aspect of the invention, the ball contains a range-finding sensor capable of triggering the capture of image data at a preset distance from a target or point of impact.

In another aspect of the invention, the ball is capable of mechanically opening an aperture to its camera lens for image capture operations when the ball is safely in flight, and retracting the lens and protecting the camera from shock prior to an impact.

In a further aspect, the object of the invention is achieved by a ball that uses orientation and location information collected by embedded sensors to actuate an embedded trajectory-changing mechanism capable of modifying the exterior surface of the ball in order to stabilize the ball and move toward a point of interest. The mechanism may act in counter-revolution with the ball's rotation in order to create an aerodynamic condition at a virtual location relative to the ball's exterior environment independent of the actual spiraling or spinning exterior surface.

In a further aspect, the object of the invention is achieved by a ball that uses orientation and location information collected by embedded sensors to actuate an embedded trajectory-changing mechanism capable of shifting the center of mass of the ball in order to stabilize the ball and move toward a point of interest. The mechanism may act in counter-revolution with the ball's rotation in order to create an aerodynamic condition at a virtual location relative to the ball's exterior environment independent of the actual spiraling or spinning exterior surface.

In still another aspect of the invention, the ball's embedded camera has a single aperture for image capture connected to a unified end of a fused fiber optic bundle; and the fiber optic bundle providing the lens with a multitude of distinctly separate images as the bundle branches out to a series of independent fused fiber optic image capture points at the exterior surface of the ball; and the ball's onboard processing unit capable of matching each discrete image in the matrix to its respective location on the ball's surface for the purpose of including or excluding images derived from a particular orientation.

In another aspect of the invention, the ball's embedded processing unit is capable of producing a contiguous video by creating a compilation of discrete frames captured from a single desired perspective available at discrete moments while the ball spirals through its trajectory, and otherwise ignores images available during the flight. The processing unit may sieve from a raw set of captured images in memory to create a compilation containing the target subject or the processing unit may trigger the camera to capture only those images that are useful in creating a compilation containing the target subject.

In another aspect of the invention, an image of the ground-based target subject is transmitted wirelessly from the ball to its ground-based user.

In another aspect of the invention, the ground-based user transmits the location of the ground-based target subject to a receiver on the ball, and the ball's on-board camera subsequently captures an image of the target.

In other aspects of the invention, the ball derives its location information from an embedded impact sensor and processing unit that uses data regarding the time of multiple impacts along a series of bounces to predict subsequent points in its path, and uses this information to trigger image capture at each successive apogee.

In other aspects of the invention, the ball contains a camera with a distance-calibrated focus and an onboard processing unit that analyzes the frequency of a series of successive image captures to determine the ball's distance from a subject.

In other aspects of the invention, the ball's embedded camera may be trained to capture images of a desired subject along its trajectory by the transmission of location information to the ball prior to the ball's flight. The data provided to the ball prior to its flight may be provided by the transmission of location information by a training unit.

In other aspects of the invention, the training unit itself may be a second ball, capable of being thrown over a desired subject and transmitting location information to the ball containing the embedded camera, with the result being the capture of a series of images taken by the ball with the embedded camera where the images are exclusively those of the subject at the location past which the training unit passed during its flight.

In other aspects of the invention, the ball containing the embedded camera senses the starting location of its trajectory and subsequently, after being thrown, exclusively captures an image of the ground-based subject at the original location.

In still other aspects, the ball is weighted to produce a gyroscopic force significant enough to maintain a repeatable spinning or precessing orbit of the camera's viewpoint around the ball's center of gravity.

BRIEF DESCRIPTION OF THE SEVERAL VIEWS OF THE DRAWINGS

FIG. 4 shows an interior view and an exterior view of an example golf ball of this invention, with small perturbations extending outwardly from the center of a few dimples in order to change the ball's airborne trajectory; FIG. 6 illustrates how the ball of this invention is capable of capturing images of a desired subject while spinning over the arc of an airborne trajectory and also shows two varying examples of image frames compiled into a video; and FIG. 7 illustrates how raw image data available to the camera of this invention may be selected, scaled, rotated and offset to produce a sequence of normalized images of a target subject.

DETAILED DESCRIPTION OF THE INVENTION

A ball capable of isolating image capture to a desired subject or perspective and further capable of changing its trajectory in order to improve the capture of video or still images is made possible by the advent of shock-resistant microelectronic GPS sensing packages, gyroscopes and multi-axis accelerometers and the availability of inexpensive high-capacity storage and low-light, high-speed image capture electronics.

Because the ball of this invention describes the capture of images from the viewpoint of a smooth arc, a video produced by the ball is substantially improved by comparison with conventional means for moving a camera. A movie captured by the ball of this invention would also be easier and faster to produce than one that required the installation of a dolly, a steadicam, a kite, or other unwieldy configuration. Lastly, a movie captured by the ball of this invention would represent a view of environments unavailable to conventional cranes, helicopters or surveillance equipment.

Figure 1:
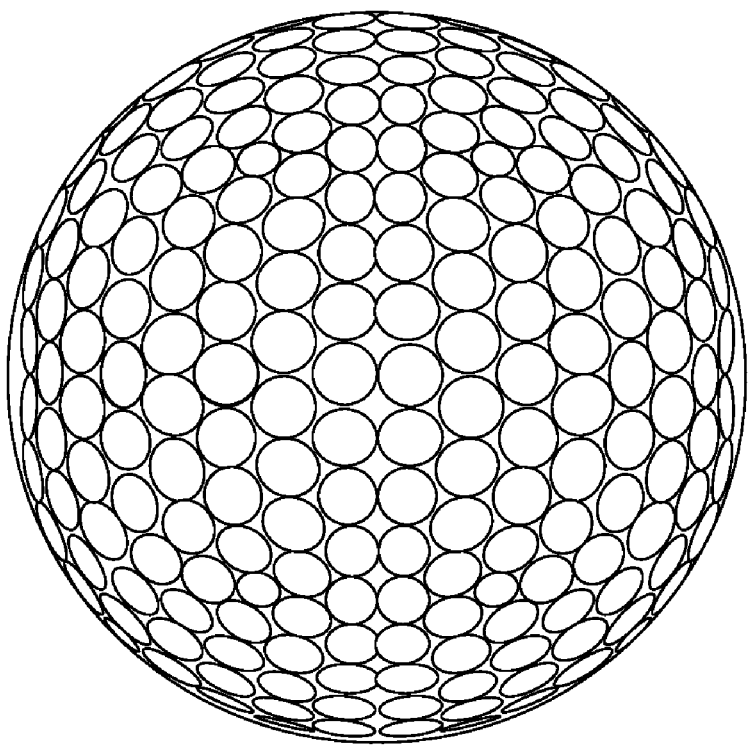
FIG. 1 shows an exterior view of a golf ball of prior art.
Figure 2:
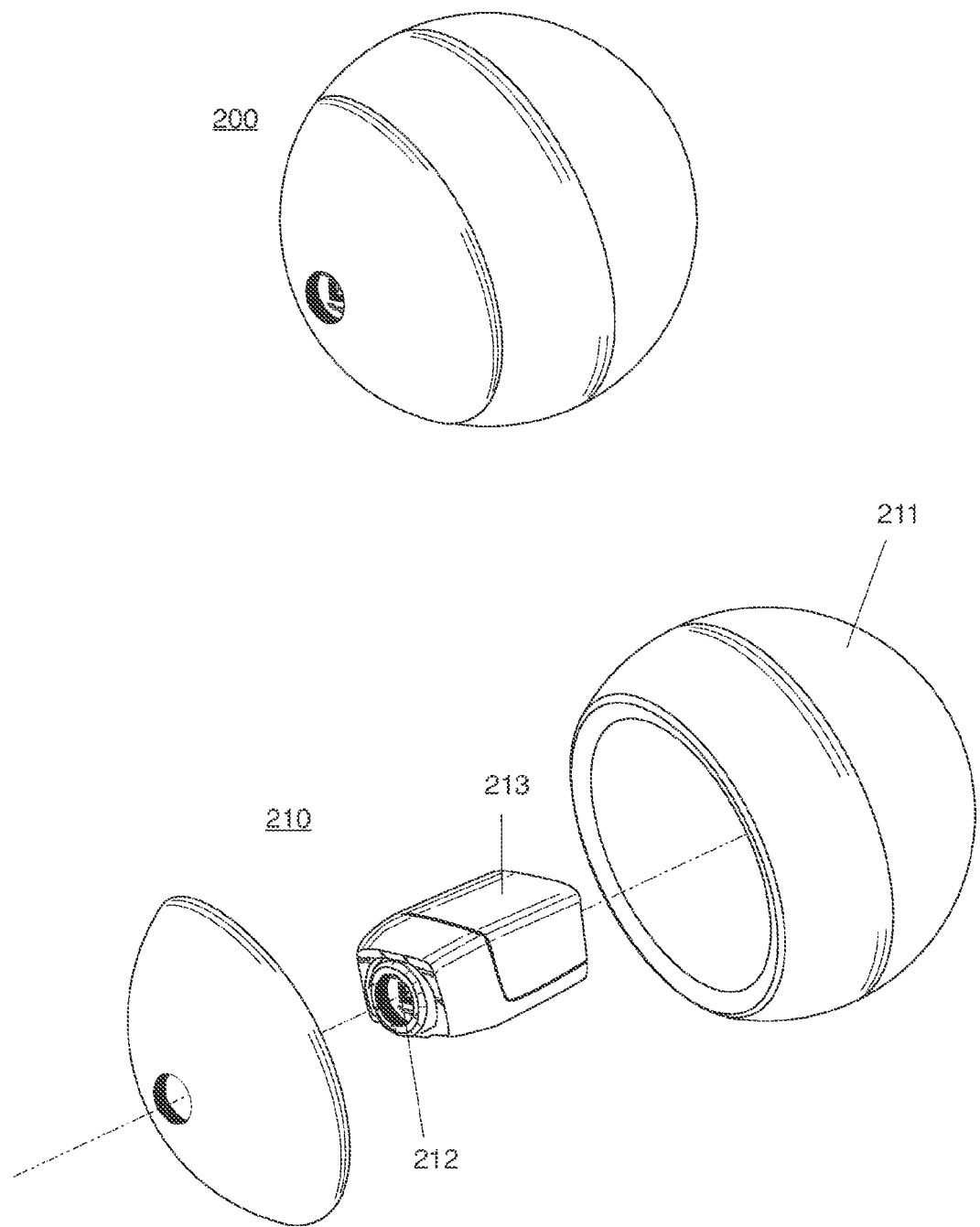
FIG. 2 shows the preferred embodiment of the ball of this invention in an assembled and an assembly view.

The preferred embodiment of the ball of this invention is shown at 200 in FIG. 2 and in a assembly view at 210. Resilient housing 211 contains camera 212, and a microelectronic package within housing 213 comprising an orientation detector, a GPS sensor, image storage memory, a transmitter and a processing unit. The processing unit monitors the orientation detector and triggers the camera to store an image when the camera is facing a predetermined ground-based target subject and to rotate the captured image to a fixed normal such as the earth's horizon. The GPS sensor enables the processing unit to trigger the images of the ground-based target subject from a desirable perspective and also for determining optimal moments for image capture over the course of the ball's airborne trajectory. The collection of stored images representing the desired subject are compiled by the processing unit into a smooth fly-by video and transmitted to the ball's ground-based user.

Image Capture Over a Spiraling Trajectory

In the preferred embodiment of the ball of this invention, a processing unit within the ball creates a smooth, linear and continuous moving picture video of a target subject produced while the embedded camera's aperture is spinning or spiraling around the ball's center of gravity and is moving through the arc of the ball's trajectory. The objective of this embodiment is to create a video that represents a camera's view of the ground-based target subject from the perspective of a single point moving along the ball's trajectory, with no apparent spinning or spiraling field of view.

Such an embodiment is made possible by the fact that a solid-state camera can be thrown or projected into a spin within a pitched ball so that it is viewing the same field of view at a frame rate approaching or exceeding an optimal video frame rate of approximately $1/30^{th}$ of a second.

The preferred embodiment of the ball of this invention captures and normalizes a smooth sequence of image frames in order to produce a sequence of video image frames as illustrated at FIG. 6. As shown, the ball has been thrown into a trajectory, and is spinning in an arced trajectory past a distant house. The state of the ball is shown at six separate successive moments in its trajectory, with the first at 610 and the second at 620, then 630, 640, 650 and the last instant at 660. The house past which the ball is traveling is shown at 600. An arrow next to each instance of the ball indicates the direction of spin. Camera 611 in the ball at 610 is not oriented in the direction of the house so the ball's processing unit does not signal the camera to capture an image when it is in this state. The camera in the ball at 620 is facing the general direction of the house as shown by arrow 621, so the processing unit signals the camera to capture an image. Similarly, when the ball arrives at the positions shown at 630, 640 and 660, its camera is facing the house as shown by respective arrows 631, 641 and 661.

The four images captured by the camera inside the ball when it is in positions 620, 630, 640 and 660 are shown in two possible examples at 670 and 680. As exemplary of the preferred embodiment of the ball of this invention at 670, the camera has captured four perspective views while remaining generally fixed on the subject of image capture, namely the house, and the processing unit has further rotated each capture to the normalized orientation of the ground-plane. At 680, the camera instead has captured a scanning view of the house, and the processing unit has further rotated each capture to the normalized orientation of the ground-plane. Both types of capture are possible because the ball is spinning fast enough to provide views of the passing house. The orientation sensor in the ball has a dual purpose, one being to provide the processing unit with the orientation of the ball for the purpose of locating the target subject of image capture, and the second being to provide the processing unit with the orientation of the ball relative to the ground-plane so a series of successive captures can be normalized to a single plane.

In the preferred embodiment of the ball of this invention, the selection of discrete frames for production of a smooth continuous video occurs as the processing unit signals capture of discrete images at select moments in time, only when the house is in the field of view, for example, and compiles these select frames into a moving-picture video.

In an alternate embodiment, the processing unit selects a target image from a plurality of images tagged with their respective orientation and position information at the time of capture. The processing unit may thereby cull a meaningful subset of images by examining the stored set of images and respective tags to select a series of images of the target subject of image capture; and then normalize each image to a predetermined plane and compile the images into a moving-picture video. This embodiment enables the camera to capture image data independent of the processing unit, allowing the processing unit time analyze, normalize and transmit images at a slower rate than the capture rate.

Because the selection of images representing the ground-based target of image capture may either occur in real time wherein the camera is triggered at appropriate moments based on the ball's position and orientation, or may occur in a process of winnowing selections from a plurality of captured images stored with their respective orientation and position tag, it is anticipated that a number of innovations described herein may be applied to either image selection method.

As shown in FIG. 7, the normalization of images captured may require 2-dimensional and 3-dimensional transformations by the sphere's processing unit. Example captured data of the camera trajectory of FIG. 6 is shown in raw form at 700, and in a normalized sequence of frames at 750. Blank image frames 701 and 705 are representative of the camera's viewpoint when the ball is at positions 610 and 650 in FIG. 6. The raw image captured at position 620 in FIG. 6 appears at 702 in FIG. 7. Similarly, images captured at positions 630, 640 and 660 in FIG. 6 appear in raw form at 703, 704 and 706 in FIG. 7.

The processing unit of this example normalizes images as shown at 750 in FIG. 7. The images available to the camera at positions 610 and 650 in FIG. 6 have been excluded by the processing unit because the processing unit was aware that the camera was not in a suitable disposition at those points in the ball's trajectory. Images 702 and 703 required a rotation, offset and scale operation to produce normalized images as seen respectively at 751 and 752. Image 704 required a rotation and an offset to produce a normalized version at 753. Raw image 706 was partially out of the camera's viewpoint, so the normalization process included only the available portion, normalizing the image by rotating and offsetting the raw image to produce an acceptable frame at 754.

Normalization to rotate a captured image to a predetermined plane such as a ground-plane is possible if the sphere includes an orientation sensor. Normalization to scale is possible using a variety of techniques. For example, the sphere may have a distance-sensing unit such as a conventional auto-focus mechanism; or an embedded position sensor and knowledge of the ground-based subject's absolute location; or image processing means to recognize the target in the capture image regardless of its size.

It is anticipated that missing image data such as the cropped rear of the house at 754, normalized from raw data at 706, may be restored using data from prior and subsequent captures.

In another embodiment of the ball of this invention, the camera is mounted on a motor shaft within the ball and spun at high speed, independent of the ball's exterior housing, so that when the ball is thrown past a subject the camera aperture is rotating at such high speed it is in position to face the subject for a quick still image capture at least $\frac{1}{30}$ times per second and potentially at much higher rates. The resulting set of captured still image frames can be combined and shown at a frame rate of $\frac{1}{30}^{th}$ of a second to produce a smooth video, as if the aperture were panning continuously along the subject. It is anticipated in this embodiment that the motor speed must compensate for the ball's own rotation and that such an adjustment is possible because the ball's rotation and in-flight data is available from the ball's processing unit.

In another embodiment of the ball of this invention, the camera is mounted on a motor shaft, independent of the ball's exterior housing, so that when the ball is thrown past a subject, the camera aperture is constantly rotated within the ball to face the subject. It is anticipated in this embodiment that the motor speed must counter the ball's own rotation and that such an adjustment is possible because the ball's rotation and in-flight data is available from the ball's processing unit.

It is anticipated that the above embodiments that require a moving camera within a ball are also possible by a fixed camera with a moving aperture; or by a fixed camera and moving mirrors; or a fixed camera with a multitude of apertures; or a fixed camera with a multitude of fused fiber optic image bundles; or any other means for capturing a sequence of images that correspond to particular locations along the ball's trajectory.

Trajectory Trigger

A ball may be designed so its image capture capabilities and mechanical trajectory-changing capabilities are triggered by a processing unit which is aware of the ball's location in space during the course of its trajectory, as well as its orientation in revolution.

In the present context, a trajectory trigger is a mechanical or electronic processing unit contained within the ball of this invention, capable of sensing the ball's in-flight position and, based on information derived from the sensed information, is capable of triggering an action, for example an image capture or a trajectory-changing mechanism.

At minimum, a trajectory trigger has at least a single sensor and a logic unit capable of signaling an action based on the state of the sensor.

Sensors employed by a trajectory trigger may, as examples, detect the ball's absolute location relative to Earth using GPS data; or sense relative velocity or acceleration using accelerometers; or sense altitude using an altimeter; or sense rotational velocity using a gyroscope; or provide information describing the time between impacts derived from a motion sensor and a clock; or recognize spatial relationships of external objects using an on-board camera. Combinations of multiple sensors and processors may further be of benefit to a trajectory trigger, for example a timing chip combined with an altimeter to provide data for predicting the arrival of the ball at its apogee.

In practice, the action initiated by a trajectory trigger may be to signal the photographic capture of an image at a precise moment in the ball's trajectory; or to actuate a mechanical device which causes a desired change in trajectory; or both actions to stabilize the ball; or both actions to redirect the ball for the purpose of capturing images of a desired subject.

The ball of this invention may contain a plurality of trajectory triggers to control image capture, camera stability and trajectory guidance events. For this reason, the trajectory trigger is described as a separate logic unit from the camera or other on-board unit that is triggering. It is anticipated that the trajectory trigger and a camera may be combined within the ball as a single package, however in the present context they are discussed separately.

The trajectory trigger may employ a variety of sensors in order to determine the appropriate moment to trigger an event within the ball. An altimeter and accelerometers may be used to detect when the ball is both at its apogee and oriented such that the desired subject is in the field of view of an embedded camera.

The trajectory trigger may use a motion sensor to detect the ball's initial pitch, and a timer to store the time length of the ball's trajectory, and an impact sensor to sense a bounce, and the combination thereof used to predict the point at which the ball reaches its apogee between successive bounces.

The trajectory trigger may use a motion sensor to detect the ball's initial pitch to initialize operations required during the ball's airborne trajectory.

The trajectory trigger may use an impact sensor to initiate shutdown operations, in order to conserve energy.

The trajectory trigger may use an accelerometer to determine the ball's position relative to its initial position when initially pitched, as well as its orientation, velocity, rotation and/or acceleration while in flight.

The trajectory trigger may use a Global Positioning System (GPS) sensor to determine its own absolute position relative to the Earth, as well as point-to-point information to calculate velocity, acceleration and other in-flight information.

The trajectory trigger may uses an antenna to detect and triangulate asynchronous energy waves, such as cell-phone microwaves or radio frequency waves, to determine the ball's relative or absolute position, orientation, velocity and/or acceleration.

The trajectory trigger may use its own transmitter and receiver to send and receive energy waves, such as infrared or radio frequency waves, to determine the ball's position, orientation, velocity and/or acceleration by bouncing the waves off an external object and receiving a reflected wave.

The trajectory trigger may receive information transmitted from a ground-based unit that transmits the ball's position, orientation, velocity and/or acceleration. The trajectory trigger may request such information from a ground-based unit, or may passively receive such information.

The trajectory trigger may have direct access to read on-board memory containing an image captured by the ball's on-board camera, analyzing the captured image and using the results of image analysis in subsequent logic operations to determine when to capture a particularly desired image. The resolution of the images captured for analysis may be lower than the images captured for reconnaissance, and may be deleted by the trajectory trigger once processed.

The trajectory trigger may analyze one or more captured images to determine the ball's position, orientation or distance relative to a subject in the camera's field of view.

The trajectory trigger may compare successive frames of images captured by the camera to determine the ball's current velocity or acceleration by comparing the movement of spatial information across the camera's field of view, or by comparing the change in frequency of the images as focus increases or decreases.

The trajectory trigger may trigger the camera based on its own pattern matching or feature recognition on of one or more prior captured images. For example, the trajectory trigger can signal the camera to capture a high-resolution photograph when it detects a human face during its analysis of a series of prior low-resolution image captures. As another example, the trajectory trigger can signal the camera to capture a high-resolution image when it detects the contrast between the earth and the earth's horizon during the analysis of a series of low-resolution captures.

The trajectory trigger may trigger the camera at a preset point in its range-finding capabilities, for example whenever the ball is exactly five feet away from a baseball batter, or whenever the ball is exactly ten feet away from the ground as it bounces down a street.

The trajectory trigger may trigger the camera at absolute points or distance intervals in its trajectory, for example at preset GPS coordinates.

The trajectory trigger may trigger the camera at fixed measurement intervals in its trajectory, for example at preset GPS distances.

The trajectory trigger may trigger the camera at points in the ball's trajectory based on logic that allows the ball to learn about its environment, and determine what images are uniquely important. For example, the ball can detect and identify repeating textures such as pavement below and sky above, thereby understanding its relationship to the earth and also allowing it to isolate foreground images from the background environment.

In an inexpensive embodiment of the invention, the trajectory trigger may uses analog photocells or photodiodes to determine the ball's orientation relative to the sky.

In an inexpensive embodiment of the invention, the trajectory trigger may use a gravity-sensing switch such as a mercury switch to signal the camera when it senses that the camera lens is approximately aligned in a downward orientation.

In another embodiment of the invention, the ball contains a liquid that substantially surrounds and contains the camera, to provide stabilization as the ball is thrown or projected.

The ball may contains an inner ball which itself contains the electrical and mechanical components, and the inner ball is substantially isolated from the outer ball by a friction-minimizing liquid which allows the inner ball to rotate freely in order to maintain a particular orientation different than that of the ball's exterior housing.

In another embodiment of the invention, an magnetic Ferro fluid exists in a layer between the ball's exterior housing and a separate, independent inner ball, and controlled from within the inner ball such that, when magnetically activated, provides a means to lock the inner ball to a fixed position relative to the exterior housing of the ball, and when not electromagnetically activated, frees the inner ball so it can rotate freely from the exterior housing.

An electric solenoid, electric motor or galvanometer may be used to control the position of the camera within the ball.

A gyroscope may be used to maintain the camera's orientation independent of the exterior housing of the ball.

The ball may be weighted to create a gyroscopic force in order to stabilize the camera or to create a repeatable orbit of the camera as it spins or precesses around the ball's center of gravity. Such a weight may create an axis around which the camera spins, with the viewpoint of the camera aligned with the axis. Images taken by the camera in alignment with an axis of spin could be rotated by the trajectory trigger using an orientation sensor to normalize the images to a single orientation.

An electric galvanometer may be used to control the position a mirror within the ball, with the mirror's reflection reflecting the subject image toward the camera lens, the primary advantage of the galvanometer/mirror combination being its rapid response to changes in the ball's behavior.

The trajectory trigger may share the ball's position, acceleration and velocity information with the camera's internal stabilization electronics to improve performance before the trajectory trigger subsequently signals the camera to capture and store a desired image.

It is anticipated that the ball may contains multiple cameras at various orientations.

It is anticipated that the camera may capture discrete still images or continuous video images.

It is anticipated that the ball may contains means for capturing a 360-degree panorama of its exterior environment. Means for creating a panorama may be provided by a single-360-degree image capture camera, by multiple cameras, or by stitching multiple captured images, each of a portion of the scene, into a single panoramic image. An orientation sensor within the ball is used to normalize captured panoramic views to a single orientation such as a fixed horizon line. Multiple panoramic views may be compiled in succession to create a three-dimensional walkthrough of the environment through which the ball passes. Three-dimensional panoramic data can be flattened to produce a two-dimensional video of a pass-through of the ball's environment as viewed from a stable perspective and orientation.

In another embodiment of the invention, the camera lens is connected to one or more fused fiber-optic bundles, which provide access to images outside of the ball. An example of the ball of this embodiment is shown at 300 in FIG. 3 and in a disassembled view at 310. At the core of the ball, camera 311 has aperture 312. Fused fiber optic bundle 313 provides aperture 312 with a matrix of images arriving from one of numerous individual, flexible, fused fiber optic bundles connected from points around the spherical exterior surface of the ball to the camera at the core of the ball. Exterior lens 314 focuses an image to be carried by fused fiber optic bundle 315 to aperture 312 for capture and storage by camera 311. An on-board orientation sensor provides an on-board processing unit with the ability to identify only those images captured while their respective fiber optic endpoints were facing a desired ground-based target subject.

Figure 3:
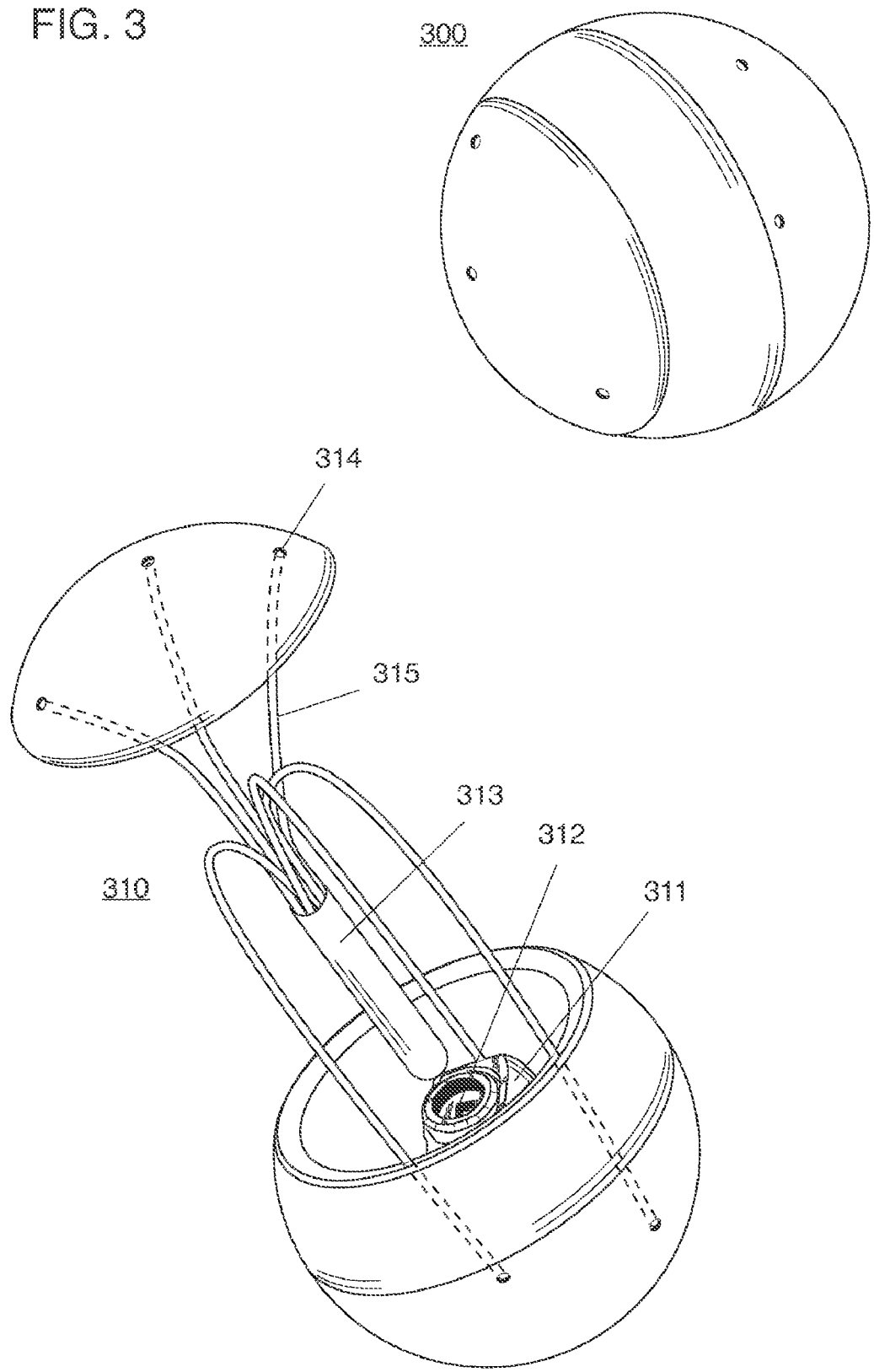
FIG. 3 shows an assembled view and an interior view of an example ball of this invention, with fused fiber optic bundles capable of providing a matrix of images to a single aperture.

The fused fiber-optic enabled ball as illustrated in FIG. 3 may be used in an alternative embodiment to capture a plurality of images at a single moment in the ball's trajectory for the purpose of stitching together a panoramic image. The on-board orientation sensor can provide the on-board processor with the ability to spatially transform each image captured to a fixed normal relative to the ground plane. A series of such panoramic images captured at successive moments over the arc of the ball's trajectory may be compiled into a viewable fly-through of the space through which the ball traveled.

The trajectory trigger may signal the camera to take a picture at one moment, for a still picture, or for a duration of time relative to a point of interest along the ball's trajectory. For example, the trajectory trigger may send an ON signal as the camera approaches its apogee and OFF signal shortly thereafter, in order to capture a moving picture video.

The trajectory trigger may signal the capture of a select set of discrete, still images as the ball is spinning along its trajectory, at singular points when the camera is facing in a desired orientation, so that when the images are compiled in sequence into a moving-picture video, the video itself depicts a scene as if the camera were panning over it rather than spiraling past it. For example, a camera contained within a ball could be triggered to take a still image each time its lens was facing the ground below. As the camera moved along its airborne trajectory, even while it was spinning within the ball an uncontrolled rotation, would only be triggered by the trajectory trigger when its lens was in a desirable orientation facing the ground below. When the set of discrete still images was combined together, the resulting video would depict a panning view of the ground beneath the ball as it moved through its trajectory, as if the ball containing the camera was not spiraling. Because a recreational ball such as a golf ball has a rotational velocity much faster than thirty revolutions per second, it is possible to capture images at a rate of at least $\frac{1}{30}^{th}$ of a second each time a particular face of the golf ball is facing in a certain direction in order to produce a stable moving-picture at a frame rate of $\frac{1}{30}^{th}$ of a second.

In an embodiment of the ball of this invention, the ball contains a camera which takes a continuous stream of still images over the course of a spiraling trajectory; and the ball's flight data such as velocity, acceleration, position and rotation is also sensed and stored over the course of the trajectory; and each still image is paired with corresponding flight data at the time the image was captured; and a subset of images is subsequently selected based on an algorithm that uses a seed image taken at a particular perspective to find other images taken from a similar perspective over the ball's flight; and the set of resulting images combined to produce a single moving picture video; the result being a video "walkthrough", or flyover of the environment through which the ball passed; and the video's perspective being editable after the ball has completed its flight by reselection of the seed image or desired viewing angle or any other similarity between images as analyzed from the ball's position/orientation/velocity data.

One or multiple cameras may be contained within the ball to create a series of stereo image pairs captured over the course of a spiraling ball's trajectory; the stereo image pairs being representative of the parallax of a pair of human eyes; and this series of series image pairs selected and cultivated based on corresponding flight data such that only stereo pairs for a desired perspective from the ball are chosen; and the resulting subset of image-pairs compiled to produce a coherent 3-dimensional video "walkthrough" or flyover.

The trajectory trigger may employ an accelerometer or similar device to provide positioning, velocity and acceleration information.

The trajectory trigger may use an impact sensor to identify the occurrence of a series of successive bounces to determine the ball's approximate trajectory, the estimated timing of its arrival at its apogee, and its arrival at points of interest along a subsequent trajectory as the ball continues bouncing. In this regard, the trajectory trigger may identify patterns in the ball's bouncing behavior that are analyzed and stored for use in the actuation of a mechanical action from within the ball, or for signaling an action within the ball such as an image capture.

The trajectory trigger may use the camera's existing mechanical, optical and digital processing capabilities to calculate position, velocity and acceleration in flight. For example, auto-focus or range-finding means can be used to determine the current distance from a fixed point such as the earth below. The trajectory trigger may analyze data from successive image captures to determine its current distance from a fixed point such as the earth below, as well as its current velocity and acceleration.

The trajectory trigger can be preset to trigger the camera when it reaches a particular velocity in flight, for example when the camera is moving at or near its maximum velocity. In this regard, a baseball could be thrown at a baseball player to capture video along the pitching path. As the ball begins to slow down, the camera lens could be retracted and insulated from the batter's impact.

The trajectory trigger may identify and responds to the capture of particular captured image. For example, the trajectory trigger can signal the camera when it detects a human face in the captured frame. Alternatively, the trajectory trigger can signal the camera when it detects the contrast between the earth and the earth's horizon.

By comparing the clarity of successive image captures as the camera moves along a trajectory, the trajectory trigger can estimate when it is approaching the apogee of its trajectory. Because a ball's velocity in relation to its subject approaches zero as the ball reaches its apogee, the clarity of the subject will remain fairly constant at the apogee. Therefore, if a camera has a fixed depth of field, the trajectory trigger may use Fourier analysis or other processing methods over successive captured frames while the ball is in flight to determine when the rate of change in pixel clarity (i.e. change from low to high frequency or vice-versa) approaches zero.

The Exterior Surface Defamation Trajectory Changer

The exterior surface deformation trajectory changer is the active means contained within the ball of this invention capable of effecting a physical deformation of the exterior surface of the ball in order to produce a desired interaction with aerodynamic forces so as to control the ball's trajectory. Such a change in trajectory may be expressed as the favoring of a particular direction or a change in lift.

The purpose of the exterior surface deformation trajectory changer is to enable the ball to move towards a desired subject, shift the trajectory over a desired path, or stabilize the ball to improve image capture capability.

The exterior surface deformation trajectory changer may change the exterior surface of the ball irrespective of the ball's current location, orientation or trajectory in order to achieve a desired trajectory. For example, the ball may be deformed into an egg-shape during flight so the ball effectively changes mid-flight from a bluff body shape to a streamlined shape with laminar airflow from head to tail.

The exterior surface deformation trajectory changer may act on the exterior surface in synchronicity with the revolution of the ball, allowing for individual changes to occur precise areas of the ball relative to the vector of aerodynamic forces to create a virtual aerodynamic surface. For example, a change made to a succession of dimples on a golf ball's exterior surface only at the moment when a particular dimple was on one side of the ball (relative to earth) would result in the ball shifting its trajectory relative to that side. This example illustrates that the function of a trajectory trigger may be required for the successful operation of exterior surface deformation trajectory changer.

A trajectory trigger may be used to signal the exterior surface deformation trajectory changer, upon the trajectory trigger's analysis of the ball's velocity, position, rotational velocity and other flight data. The logic of the trajectory trigger signals the deformation at the exterior surface to occur at a precise time in the ball's rotation, allowing for control of surfaces relative to the leading surface at that moment, the leeward surface at that moment, the left, right, upper and lower surfaces at that moment.

The exterior surface deformation trajectory changer may be a mechanical force, a hydraulic force or any other controllable expression of force acting from within the ball to effect a change on the exterior surface.

In the preferred embodiment of the trajectory-changer of this invention, a portion of the exterior surface of the ball is constructed using a material of substantially flexible property such that corresponding at a number of points surrounding the balls exterior surface exists an underlying mechanical actuator which applies an outward or inward force on the inside surface of the ball's exterior shell. The flexible portion of the shell bulges out in a convex contour or caves in a concave contour, expressed as a series of points, which change from dimples to pimples based on the logic of the trajectory trigger.

Because the ball of this invention is in free rotation, not aligned on a particular axis to aerodynamic forces like a rocket, it is anticipated that the exterior surface deformation trajectory changer must control a change in direction or lift by creating a ripple of changes from point to point along the exterior surface, with the ripple moving along the ball's exterior surface opposite to (and at the rate of) the ball's rotation. In this manner, for example, an aerodynamic "flap" could be created on a golf ball's lower surface (relative to arriving aerodynamic forces) by creating one row of pimples at the points that were on the ball's lower surface at a single moment in time; and at a moment later creating a second row of pimples at the new points that were on the lower surface, retracting the first set; and then creating a third row and retracting the second; and continue this action to create a ripple moving opposite the vector of the ball's rotation, so that the ripple produced a virtual wall of pimples on the ball's lower surface (relative to aerodynamic forces acting on the ball), thereby producing a desired lift.

As described, the exterior surface deformation trajectory changer may act on the surface of the ball to create an asymmetric condition relative to aerodynamic forces acting on the ball.

The exterior surface deformation trajectory changer is also capable of changing the ball's trajectory by effecting changes on the surface that are expressed symmetrically around the ball, in order to decrease drag by creating a thin unseparated layer of turbulent air. In this regard, for example, the dimples of a golf ball of this invention which serve to decrease drag can be modulated in depth and contour for particular wind-speeds, rotational velocities, trajectory mapping goals and other in-flight performance criteria determined while the ball is in flight.

The golf ball of this invention, with an exterior surface deformation trajectory changer being signaled by a trajectory trigger, is capable of fine-tuning dimple depth, contour and shape for any possible aerodynamic interaction encountered at any point during the ball's trajectory.

The ball of this invention may be expressed as a golf ball constructed so each concave dimple has a flexible dimple-pit measuring only a fraction of the diameter of the entire dimple, capable of responding to slight pressure from within the ball so as to create a convex bump acting outwardly from the dimple-pit. Pressure on each dimple pit of a golf ball can arrive from the shaft of an electronic solenoid at the ball's core, or from the shaft of one electromagnetic solenoid per dimple, arranged to correspond with each dimple beneath the ball's exterior surface.

As described in the above example, the internal mechanical actuator may derive its ability to force a change in the ball's exterior surface by electrical means, such as in the activation of a solenoid. An interior view of an example golf ball of this type is shown at 400 in FIG. 4. The golf ball has an exterior surface with conventional dimples such as at 401. Core 402 is a sphere contained within the center of the golf ball, itself containing the trajectory trigger logic. Solenoid 403 is one of a plurality of solenoids mounted on core 402, with shaft 404 extending outward to a dimple on the surface of the ball. Each of the solenoids, shafts and corresponding dimples are controlled by connection to a trajectory trigger within core 402 which is processing the ball's velocity, rotation, acceleration, position and other factors regarding the ball's trajectory.

An exterior view of the golf ball 400 is shown at 410, with dashed lines illustrating the actuators at the center of the ball. Tips of each shaft at 411 are shown flush with the exterior surface of each respective dimple. As the golf ball travels at high speed during routine play, the extension of any particular shaft tip is significant in altering the aerodynamic profile of the ball and thus changing its airborne trajectory. The trajectory trigger bases decisions regarding extension of a shaft on the current trajectory, orientation, rotational velocity, acceleration and other factors governing the in-flight path of the ball.

Figure 5:
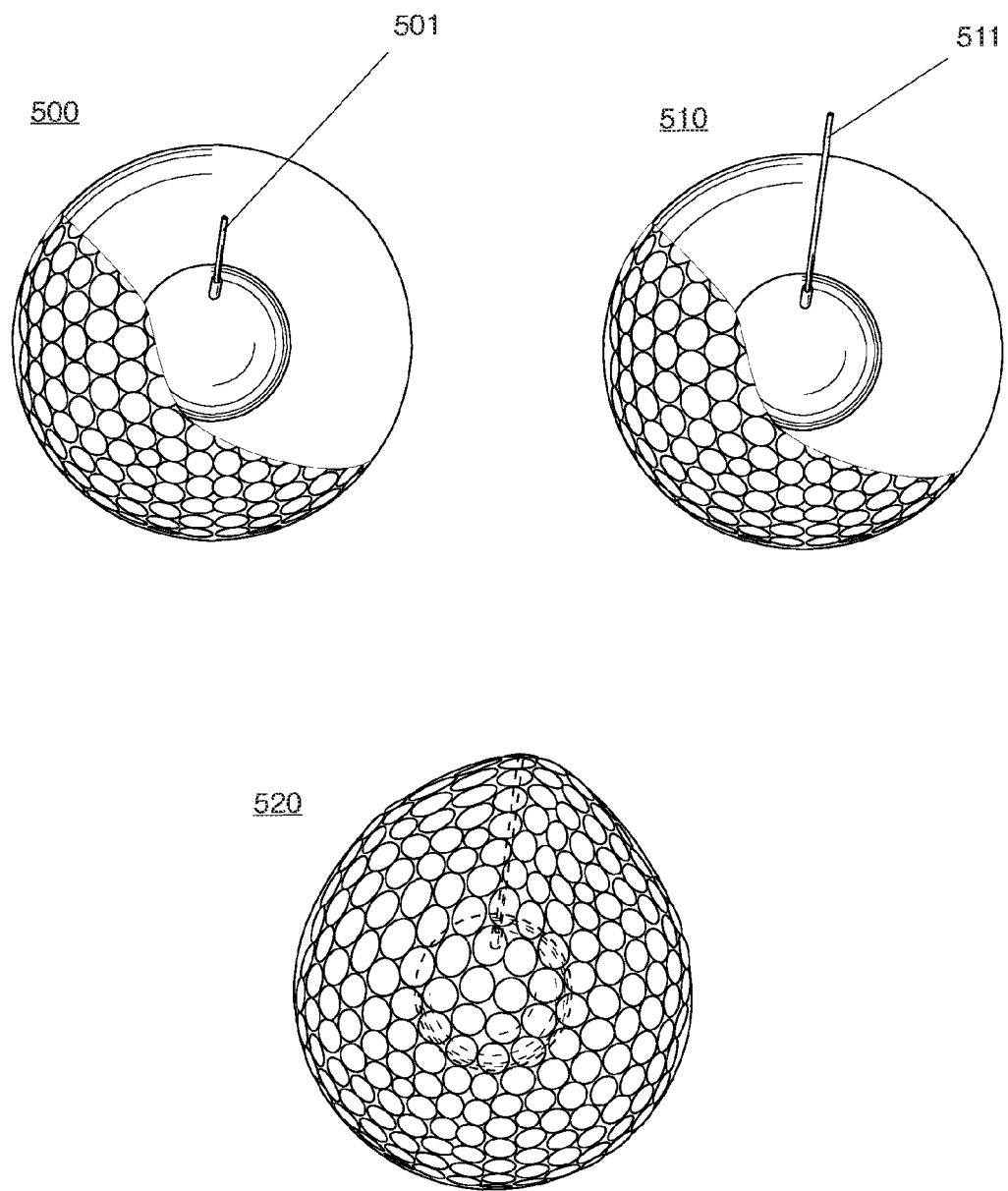
FIG. 5 shows two interior views and an exterior view of an example golf ball of this invention with a shape-altering mechanism capable of changing the ball's airborne trajectory.

Another example of a ball capable of changing its aerodynamic disposition is shown at FIG. 5. This ball has a core containing a single solenoid and shaft similar in its extension and retraction as described in FIG. 4. Unlike the ball of at FIG. 4 which extends a shaft from a single dimple when the internal solenoid is actuated, however, the shaft tip of the embodiment of FIG. 5 is entirely contained within the ball even when extended. At rest as shown in an interior view at 500, shaft 501 is retracted and does not press outwardly on the ball. When the solenoid is actuated as shown at 510, shaft tip 511 presses outwardly against the interior surface of the ball, changing the shape of the ball as shown at 520, thereby altering the aerodynamic profile of the ball as it travels at high speed. The example shown in this figure illustrated has an exaggerated egg shape, and is entirely unrealistic, especially considering that a golf ball is not typically traveling with a distinct leading surface and trailing surface. In an actual application, however, this example is used to suggest that a slight adjustment to the ball's shape, even one that is nearly imperceptible to the human eye, is sufficient to significantly alter a ball's trajectory during a high-speed flight.

Because a golf ball requires significant force to initiate a high-velocity trajectory, it is anticipated that the solenoid shafts of FIG. 4 and FIG. 5 might not withstand the initial impact of a golf club. The shafts of FIG. 4 and FIG. 5 are shown as examples of methods to alter the exterior surface of a golf ball, but the ball of this invention may benefit from other methods for storing, transferring and expressing energy using flexible shafts, hollow tubes for the transfer of air or liquids, springs, coils, bladders, pneumatic pistons, etc.

A possible method for dynamically changing the exterior surface of the ball during flight which could withstand the forces of impact would be in the application of hydraulic pressure. In one embodiment of a golf ball with hydraulic-activated dimples would include the exterior layer and a sub-layer divided into cells, one cell per dimple, and with each cell containing a small amount of hydraulic fluid, and with the cell further connected on its inward facing surface to a liquid-carrying tube, connected to a pump at the core of the ball, and activated by the logic of a trajectory trigger to determine the correct modulation of pulsed pressures required to achieve a desired aerodynamic interaction as the ball passes through its trajectory.

Another possible method for altering the exterior surface of a recreational ball may be expressed by an internal mechanical actuator which derives its ability to force a change in the ball's shape or exterior surface by air pressure, for example by capturing air in narrow tunnels or pockets; harnessing the moving air and converting it to electrical energy or a mechanical air pressure pump within the core of the ball; and thereby actuating a change to the surface profile of the ball in order to change the ball's lift.

The entire actuation system used to change a ball's aerodynamic profile by applying force from within the ball can exist within a thin laminar layer beneath the exterior surface of the ball, allowing the core of the ball to be available for use for other purposes, for example to contain a camera as described earlier in this document. As an example of a possible mechanical system that can reside below the exterior surface, a substantially flat magnetic coil may be embedded in a layer below a golf ball's exterior surface and corresponding with a dimple; and the dimple itself constructed of a material that is responsive to subtle changes in the surrounding magnetic field; and by activation of the magnetic coil from a signal by the logic of a trajectory trigger, the exterior surface of the dimple may be slightly altered and thus the ball's trajectory can be manipulated.

In another embodiment of the invention, the pimples or perturbations described earlier regarding FIG. 4 are extremely small, perhaps a fraction of the diameter of a single dimple, and act as a combined system to alter the aerodynamic profile.

In another embodiment of the invention, the aforementioned perturbations are as relatively large, where the shifting of a single perturbation can alter the aerodynamic profile of the ball.

The Internally Contained Mechanical Trajectory Changer

The ball of this invention is capable of changing its own trajectory while moving at high speed and at a high rotational velocity by creating pulses of force at precisely timed moments in its airborne trajectory, thereby favoring a particular direction or inducing fine disturbances in airflow capable of increasing lift.

The purpose of the internally contained mechanical trajectory changer is to enable the ball to move towards a desired subject, shift the trajectory over a desired path, or stabilize the ball to improve image capture capability.

The internally contained mechanical trajectory changer is the mechanical means contained and expressed entirely inside the ball of this invention which itself exerts a force that acts on the entire ball so as to cause the ball to achieve a desired aerodynamic interaction with the force of headwinds.

The internally contained mechanical trajectory changer may cause the ball precess around a moment other than its physical center, thereby causing a desired interaction with aerodynamic forces acting on the ball's surface. Controlled by the trajectory trigger, with sensors capable of detecting the orientation of the ball, the actions of the internally contained mechanical trajectory changer can be synchronized with the spinning of the ball as it spirals through its trajectory. The ball's center of mass may be moving within the ball along the arced trajectory independent of the physical center of the ball.

The internally contained mechanical trajectory changer may enable the ball to position a perturbation on the ball's exterior by shifting weight at the core of the ball such that the center of gravity shifts away from the center of the ball. By shifting the location of the perturbation, the internally contained mechanical trajectory changer thereby allows the ball to control a desired interaction with aerodynamic forces acting on the ball's surface. With the addition of a trajectory trigger, capable of detecting the orientation of the ball, the actions of the internally contained mechanical trajectory changer can be directed to achieve a particular goal in changing its trajectory or stabilizing the ball for image capture.

In an example embodiment of an internally contained mechanical trajectory changer of this invention, a battery is used to shift a mass contained within the ball, and the resulting counterforce itself causing a shift in the disposition of the outer housing of the ball relative to aerodynamic forces acting on it. In this embodiment, the trajectory trigger signals the pulsed or intermittent shifting of the interior mass based on the ball's position, velocity, rotation, wind resistance and other flight data.

Unlike a ball that precesses around an off-center center of gravity, the ball of this invention can employ an internally contained mechanical trajectory changer at a precise moment in the ball's trajectory and disposition to aerodynamic forces, so that the force from within is of particular importance to the exact condition of the ball at that given point. The movement of a mass at the core of the ball synchronized opposite the spin direction of the ball allows the ball to control, direct and inhibit the precessing of the exterior surface of the ball around its center of gravity.

While the ball of this invention is anticipated to be a sphere, generally symmetric with respect to aerodynamic forces acting upon it, the ball may have one or more asymmetric, fixed perturbations on its exterior surface. Such a perturbation may exist at a small fraction of the diameter of the size of the ball, and for balls that enter a high-speed trajectory it is anticipated that the perturbation may so small as to be nearly imperceptible to the human touch. Such a small perturbation, capable of disrupting laminar airflow across the balls surface, may provide a suitable aerodynamic impact such that the ball's direction, lift and stability are entirely controllable when the perturbation is maintained in a fixed position as the ball moves through its trajectory.

An internally contained mechanical trajectory changer, continually shifting an internal mass in a fixed direction independent of the spin of the ball, can move the center of mass to favor a disposition where an exterior perturbation interacts with headwinds in order to either change the ball's trajectory towards a desired direction or stabilize the exterior surface of the ball so an embedded camera is advantaged in its view of a desired subject.

The internal mass may be moved substantially so the ball's center of mass is at the front of the ball relative to aerodynamic forces acting on the exterior of the ball.

The internal mass may be spun within the ball in counter revolution to aerodynamic forces acting on the surface of the ball in order to, for example, position a perturbation on the ball's surface at a desired disposition relative to headwinds for the purpose of changing direction or stabilizing the picture-taking orientation of an embedded camera.

The internal mass may be spun within the ball to create a gyroscope which favors the position of a perturbation on the ball's surface at a desired disposition relative to headwinds for the purpose of changing direction or stabilizing the picture-taking orientation of an embedded camera.

A ball with a slight perturbation as describe by the above embodiment is a unique instance of a recreational flying object that is predominately spherical in shape, yet moving and spinning at a velocity where a subtle, controlled expression of a shift in inertial forces can produce a desired change in the airborne trajectory.

The trajectory trigger may control the operation of a motor which has a housing affixed to the interior surface of the ball's exterior housing; and the motor has a shaft extending to the opposite end of the ball; and on the shaft is a metal weight; and the center of the metal weight represents the ball's center of mass so that the metal weight is always at the leading portion of the ball when in flight; and with a dimple existing on the exterior surface of the ball at a point on the side of the ball away from its leading or trailing surface; and the motor engaged while the ball is in flight so that the counter-forces of rotation acting on the exterior surface of the ball by attachment to the motor housing cause the dimple to continually re-align itself on one side of the ball; and the realignment of the dimple creates aerodynamic drag on that side of the ball, changing the trajectory so that the ball shifts toward that side.

The above example allows a dimple to be rotated to a particular side of a ball while in flight, effectively using aerodynamic drag to pull the ball in that direction. If the motor of the above example is mounted on a gimbal and the gimbal is affixed to the interior surface of the ball's exterior housing, the dimple could be rotated to favor a particular side, as well as towards the leading or trailing surfaces of the ball in flight.

The ball of FIG. 4 as earlier described one in which the shafts of a number of solenoids extended from the ball's core to the exterior surface of the ball. If, however, the shafts of the ball of FIG. 4 were shortened so they did not approach the point of interaction with the exterior surface of the ball, and if instead a small weight of meaningful mass were placed at the end of each shaft, the ball's trajectory could be impacted by the extension and retraction of the shafts with no expression on the outer surface of the ball. Furthermore, with the addition of a trajectory trigger, the modulated extension and retraction of selective shafts could effect a change in the ball's disposition to aerodynamic forces such that its center of lift was controllable entirely from within the ball. On a ball of this invention with a single fixed convex pimple on its exterior surface, this type of internally contained mechanical trajectory changer could be used to ensure that the pimple was, even while spiraling around the ball, favoring the left side of the ball enough to pull the ball to the left.

It is possible for an internally contained mechanical trajectory changer to exist just beneath the exterior surface of the ball, leaving the volume of the core available for other purposes. As an example of an internally contained mechanical trajectory changer of this type, a golf ball may have, beneath its exterior surface, a layer of magnetic Ferro fluid. Immersed within the Ferro fluid, and positioned to correspond with each dimple of the golf ball is a magnetic coil activated by the trajectory trigger. When the magnetic coils are pulsed with electricity, the Ferro fluid in the immediate area of the coil solidifies, creating a slight shift in the center of mass and thereby causing enough of a disturbance so as to create an asymmetry in the ball's disposition to aerodynamic forces acting on it, and thus creating a controllable change in trajectory.

In another embodiment of the internally contained mechanical trajectory changer, a mechanical force applied at one endpoint of the axis of rotation of a gyroscope in a vector perpendicular to that axis is expressed as counterforce on the housing of the ball. It is anticipated that the mechanical means for applying force on the gyroscope may be by attachment of one end of its rotational axis to a motor or solenoid.

In another embodiment of an internally contained mechanical trajectory changer, three solenoids are housed within the ball with shafts at respective x, y and z axes, with each solenoid controllable by the trajectory trigger. The actuation of a particular solenoid's shaft would be expressed as an opposite force acting on the ball's housing.

An internally contained mechanical trajectory changer can be used to generate lift by creating a turbulence-inducing vibration when a ball enters a high-speed trajectory. This turbulence, if existing in a thin, unseparated layer of air, can reduce drag by insulating the ball's surface with the high-speed layer of moving air.

Additional Applications for the Trajectory Trigger

The trajectory trigger may trigger a flash at or near the camera trigger point, to illuminate the subject.

The trajectory trigger may activate an LED or audible signal in advance of the camera trigger point, to signal that an image will shortly be captured.

The trajectory trigger may activate an LED or audible signal in advance of the camera trigger point, to signal that the desired image has been taken and that the ball can be retrieved.

In the preferred embodiment of the ball of this invention, normalized images representing the ground-based target subject are transmitted wirelessly to the ball's user. It is anticipated that the ball may include hardwired communications such as a USB or Firewire port to provide image data to the user upon completion of the ball's trajectory.

Information sensed and analyzed by the trajectory trigger may be stored or transmitted for uses other than related to the ball's own flight. For example, velocity information used to alter the ball's trajectory in flight may be communicated to a ground-based control system for display. In another example similar to the "black box" of commercial airplanes, the information from a ball's trajectory may be made stored by the trajectory trigger and later provided by connection or transmission to an external system.

Information sensed and analyzed by the trajectory trigger may be transmitted for immediate processing by a ground-based unit separate from the ball, and then returned to the trajectory trigger by a ground-based transmitter for the trajectory trigger's continued operation in signaling an action from with the ball.

The trajectory trigger within a particular ball may use its own transmitter and receiver to send information to and receive information from a second ball that is also in-flight, to determine its spatial relationship in flight to the second ball and thereby can initiate self-contained means to change trajectory for collision avoidance.

The Location Transmitter

In another embodiment of the ball of this invention, the ball contains a camera and a trajectory trigger and a receiver capable of receiving ground-based signals; and a separate ground-based location transmitter that sends its location to the receiving unit; and logic within the trajectory trigger that signals the camera when A) the received location information that defines a subject for image-taking is framed within the airborne camera's field of view AND ALSO B) the trajectory trigger determines that the ball is at an optimal point for picture taking in its trajectory (i.e. at its apogee). In this embodiment, because the camera within the airborne ball may itself be spiraling as the ball spins, the trajectory trigger must use its positioning information to determine an exact moment (or series of moments) to capture images of the subject.

It should be noted that, unlike airborne cameras of prior art which may be immediately triggered by a ground-based transmitter, the camera contained within the ball of this invention as described in the above embodiment is not itself immediately triggered by the transmitter. The location transmitter of this invention sends a constant stream of location information which is thereby available to the ball's internal trajectory trigger as it determines the best location in the ball's trajectory to capture an image of the subject at the transmitter's location.

In the above embodiment, the location transmitter is ground-based and hand-held by the person who threw the ball into its trajectory. The resulting images taken by the ball's internal camera are that of the ground-based subject near the transmitter.

In another embodiment of the ball of this invention, the location transmitter may be stored within the ball, and detachable from the ball when in use. If the ball is thrown in the air with the location transmitter still contained within its housing, the location transmitter is disabled and the trajectory trigger uses its trajectory data to determine when to capture an image. When the location transmitter is removed from the ball, however, the location transmitter begins transmitting information to the trajectory trigger, and the ball is pitched into a trajectory while the transmitter remains behind.

In another embodiment of the ball of this invention, the location transmitter is ball-shaped, and can be thrown separately from the recreational ball. In this way, the camera within the airborne recreational ball can be signaled by the trajectory trigger to "follow" the location transmitter's separate trajectory, capturing images over a range of subjects. The camera's focus is separately maintained to focus on a field of view beyond the airborne location transmitter while remaining fixed on the direction of the airborne location transmitter.

In an example operation of this embodiment, one person pitches the recreational ball high up into the air, and a second person throws the location transmitter in a lateral trajectory over a range of ground-based subjects. The trajectory trigger analyzes the ball's rotation and location, triggering the camera to capture all of the subjects in the field of view past the airborne location transmitter, as if the camera were smoothly panning and scanning over the entire area over which the location transmitter was thrown.

In another embodiment of the ball of this invention, the trajectory trigger can store location information received from the location transmitter, and later use this information to trigger the camera when the camera is at an optimal point in its own trajectory to capture the desired subjects. In this embodiment, the location transmitter is "training" the trajectory trigger before the ball containing the trajectory trigger and camera are thrown into the air. This embodiment allows a ball containing a location transmitter to be thrown before a recreational ball containing a camera, by the same person.

To further illustrate an example of this embodiment, a recreational ball containing a camera, trajectory trigger and receiver is held separately from a location transmitter. The person first throws the location transmitter over a group of friends, while the trajectory trigger within the held recreational ball receives and stores this location information. The person then throws the recreational ball into the air, at which time the stored location information is retrieved by the trajectory trigger. Using this location information as well as its own positioning information, the trajectory trigger delays until the recreational ball is nearing its apogee and then signals the camera to capture frames only from perspectives which would could be compiled as a video as a smooth, continuous panning shot across and high above the group of friends.

The Training Logic and Storage Unit

In another embodiment of the recreational ball of this invention, the ball entirely contains a trajectory trigger; and a camera that is triggered by the trajectory trigger; and a training logic and storage unit described herein. The training logic and storage unit enables the ball to be "trained" during a first stage of play, prior to entering a second stage when the ball is thrown high up into the image-capture trajectory. The purpose of the training logic and storage unit is to train the ball before its main flight so that the ball's camera can capture the trained points of interest to during the second-stage image capture flight.

The "training" accomplished by the training logic and storage unit occurs as follows: When the training logic and storage unit is turned on, it begins storing data that reflects the current location of the ball (available to and provided by the trajectory trigger), and the length of time that the ball is held at the location. The recreational ball containing the training logic and storage unit is then passed across an area of interest. To illustrate and example, a line of people are standing on a beach and the ball of this embodiment is carried by one person along the line. When the ball is held near the head of each person in line, the person holding it pauses for few seconds before moving to the next person. During this time, the training logic and storage unit is storing the physical location near the head of each person in line, and the approximate amount of time paused near each head. When the person holding the ball reaches the end of the line, he turns the training logic and storage unit off so the training logic and storage unit retains the stored location-time data in memory but is no longer storing new location-time information. Then, the ball is pitched high up into the air. The trajectory trigger has access to location information described earlier in this document, but also has access to the location-time information previously stored by the training logic and storage unit. The trajectory trigger uses the training logic and storage unit information to direct the camera toward each point of interest, continuing to capture frames according to the location and the time "trained" by the training logic and storage unit. The resulting captured frames, when compiled together, produces a viewable video which shows a scene from the ball's perspective of the people standing along the beach, focused towards each person's head for a short pause, and then panning or scanning along the line to the next person—as trained. The trajectory trigger has calculated the appropriate moments when the camera is capable of meeting its trained objective, according to the location-time data stored by the training logic and storage unit.

It is anticipated that the video or image frames captured under the above embodiment may require post-processing by an independent image processing unit if, for example, the captured image data is significantly more than required for a single desirable tracking shot.

It is anticipated that the training logic and storage unit has access to memory and logic within the trajectory trigger, including accelerometer, GPS, and other sensor readings, to provide the current location of the ball during training. It is also anticipated that the training logic and storage unit may use pre-flight image data captured by the camera, in its capacity identifying and storing the current location of the ball during training.

It is anticipated that the training logic and storage unit may be moving at high speed within a spinning, spiraling or precessing ball while still in its training mode, and can depend on the trajectory trigger to signal appropriate locations and times for picture capture, which are stored during training and recovered later by the trajectory trigger during the ball's non-training flight. In this regard, the ball can be tossed from one person to another during training, and then thrown high above for the image capture stage.

Gravity-Assisted Camera Aperture Stabilizer

In another embodiment of this invention, a spherical object such as a recreational ball can contain a camera which is independent from the ball's exterior housing, so that the camera's orientation is governed by gravitational force and the inertial forces moving the ball through its trajectory, but generally not impacted by rotational forces acting on the ball.

In this embodiment of the ball of this invention, the embedded camera is mounted within the ball, but independent of the ball's exterior housing so that when the ball is thrown into the air, the camera aperture remains generally stable in a direction fixed with respect to gravitational force. This enables the ball, for example, to take still images and video in an earth-facing orientation while the ball is thrown, spun or spiraled into the air.

Other Innovations of the Ball of this Invention

It is anticipated that the ball of this invention may be self-powered or enhanced by energy derived upon impact with a solid body such as a golf club, using a piezo element or other process for converting, storing and utilizing such energy.

It is anticipated that the ball of this invention, particularly a ball constructed of a translucent material and containing a camera and trajectory trigger, may be self-powered or enhanced by energy generated by passive solar cells encapsulated beneath the ball's exterior surface.

It is anticipated that the ball of this invention may be self-powered or enhanced by the storage of compressive forces and controlled release of such forces. For example, a golf ball of this invention may be designed so that impact with a golf club forces a volume of liquid through a valve and into a pressurized bladder, and the liquid's subsequent release from the bladder be controlled over a prolonged period; and release of the liquid and its application in changing the ball's trajectory be governed by information analyzed by a trajectory trigger.

It is anticipated that the uniquely innovative combined elements of this invention, for example 1) the combination of (1a) an internal trajectory trigger and (1b) camera, or 2) the combination of in (2a) internal trajectory trigger with (2b) means for changing trajectory by (2b-1) altering the aerodynamic profile by deforming the exterior surface of a flying object from within the flying object or (2b-2) by shifting mass or an inertial force contained entirely in the interior of a flying object, are all applicable to other recreational airborne objects of non-spherical shapes.

It is anticipated that while the recreational ball of this invention is expected to encounter aerodynamic forces as the ball is pitched into the air, it is possible to create an embodiment that operates while in a liquid, for example in a recreational pool or in an ocean, and with all the components working to create a desired effect for the operating environment.

It is anticipated that for a sphere of a given volume and mass, an internal timer may be sufficient to approximate position information.

It is anticipated that one or more improvements described by the invention described herein may be incorporated into standard recreational balls or other recreational airborne objects such as bouncing balls, tennis balls, golf balls and baseballs.

CONCLUSION

The foregoing Detailed description has disclosed to those skilled in the relevant disciplines how to make and use the ball of the invention and has also disclosed the best mode presently known to the inventor of making and using such ball. It will however be immediately apparent to those skilled in the relevant disciplines that balls made according to the principles of the invention may be implemented in many ways other than the ways disclosed herein. For example, the ball may be made of any present or future technology that serves to provide position and orientation information relative to the ground-based subject. Further, although a spherical shape is described, aspects of embodiments of the invention described herein may be applicable to other aerodynamic shapes. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. An image capture apparatus comprising:
a substantially spherical, resilient housing that is thrown or projected into an airborne trajectory;
a camera with a view to the exterior environment;
an orientation sensor for determining the orientation of the camera relative to Earth;
a position sensor for determining the location of the camera along the arc of its airborne trajectory;
a memory unit for storage of one of image data, camera position and camera orientation;
a processing unit for performing logical operations;

a communications unit for providing the user of the apparatus with an image;

wherein the processing unit causes an image to be captured when the camera reaches a predetermined location; and wherein the orientation of the captured image is transformed such that the resulting image provided to the user is oriented with Earth below and sky above.

2. The image capture apparatus of claim 1 wherein:

the position sensor is at least one of GPS sensors, timers, accelerometers, motion sensors, altitude sensors, impact sensors and gyroscopes.

3. The image capture apparatus of claim 1 wherein:

the predetermined location at which an image is captured is proximate to the apogee of the camera's airborne trajectory.

4. The image capture apparatus of claim 1 wherein:

the location of a target of image capture is known to the processing unit in advance of the camera's arrival at the location at which an image is captured; and the processing unit monitors camera position and camera orientation with respect to the known location of the target to determine when the target is in view of the camera aperture; whereby upon such a determination the camera is triggered to capture an image of the target.

5. The image capture apparatus of claim 4 wherein:

the location of the target is transmitted wirelessly to the apparatus.

6. The image capture apparatus of claim 4 wherein:

a plurality of images containing a portion of the target are captured at successive locations along the arc of the camera's airborne trajectory; and each image is transformed such that the resulting image is oriented with Earth below and sky above; and each image is transformed so that the portion of the target contained in the image is substantially aligned in registration with the plurality of captured images; and the transformed images are compiled into a smooth fly-by video of the target from the perspective of the camera; and the user of the apparatus is provided with the video.

7. The image capture apparatus of claim 1 wherein:

a plurality of images are captured and stored irrespective of camera location and orientation; and each image is stored with the location and orientation of the camera at the time of its capture; and the location of a target of image capture is known to the processing unit in advance of supplying an image to the user; and the processing unit selects a stored image containing a portion of the target of image capture, said selection determined by the camera location and orientation relative to the target; whereby the user of the apparatus is provided with an image containing a portion of the target.

8. The image capture apparatus of claim 7 wherein:

the processing unit selects a plurality of images containing the target; and the processing unit transforms the images to be oriented and substantially aligned in registration with each other; and the processing unit compiles the images into a video; whereby the user of the apparatus is provided with a fly-by video of the target.

9. The image capture apparatus of claim 1 wherein:

a plurality of images are captured from a substantially similar location, each image containing a portion of a larger target of image capture; and the plurality of images are stitched together at neighboring edges by the processing unit; whereby the resulting stitched image provided to the user is a substantially seamless panoramic image of the larger target of image capture.

10. The image capture apparatus of claim 9 wherein:

the plurality of images is provided by a plurality of cameras distributed around the exterior of the spherical housing; and the distribution of the cameras at the exterior of the spherical housing provides a full spherical panoramic view of the exterior environment; and the cameras are synchronized to capture each respective image at a substantially similar moment in time.

11. The image capture apparatus of claim 9 wherein:

the plurality of images captured from a substantially similar location is a succession of individual images captured by a rapidly spinning camera.

12. The image capture apparatus of claim 9 wherein:

the camera has a single aperture; and said aperture is connected to an end of a fused fiber optic bundle; and said fused fiber optic bundle branches out from its proximal end to a plurality of distal endpoints; and each distal endpoint provides a coherent image to the cable's proximal end; and distal endpoints of the fused optic bundle are distributed and affixed to unique locations at the exterior housing of the sphere; and the camera aperture is provided with a plurality of views looking outwardly in varying directions from the spherical housing; and the image captured by the camera being a mosaic of individual images, each individual image representing the unique view from the respective endpoint of the fused fiber optic bundle; and the plurality of images in the mosaic are used as a source for stitching the panoramic image being the individual images in the mosaic.

13. The image capture apparatus of claim 1 wherein:

the apparatus further comprises a mass for the purpose of creating a gyroscopic force; and the force acting on the spherical housing such that a camera aperture at the exterior surface of the spherical housing travels on a generally repeating orbit around the axis of rotation.

14. The image capture apparatus of claim 1 wherein:

the processing unit causes an image to be captured when the camera is both proximate to the apogee of the its airborne trajectory and generally facing the center of the Earth.

15. The image capture apparatus of claim 1 wherein:

at each one of a plurality of locations along the trajectory of the camera, a plurality of images are captured; and the plurality of images are stitched together, the resulting stitched image being a generally seamless panoramic image; and the resulting plurality of seamless panoramic images are compiled in series into a continuous, panoramic, fly-through video of the environment through which the camera traveled.

16. An image capture apparatus comprising:

a substantially spherical, resilient housing that is thrown or projected into an airborne trajectory;

a camera capable of capturing a plurality of images from a plurality of apertures facing outwardly from the sphere;

a position sensor for determining the location of the camera along the arc of its airborne trajectory;

a processing unit for performing logical operations;

a communications unit for providing the user of the apparatus with an image;

a memory unit for storage of image data; wherein an image capture is triggered when the camera is substantially proximate to a predetermined location along the arc of its airborne trajectory; and the plurality of images are stitched together at neighboring edges; whereby the resulting stitched image provided to the user is a generally seamless panoramic image.

17. The image capture apparatus of claim 16 wherein:
wherein the position sensor is at least one of GPS sensors, timers, accelerometers, motion sensors, altitude sensors, impact sensors and gyroscopes.

18. The image capture apparatus of claim 16 wherein:
the image provided to the user is a full spherical panoramic image.

19. The image capture apparatus of claim 16 wherein:
the predetermined location at which the camera is triggered to capture is the apogee of the camera's airborne trajectory.

20. The image capture apparatus of claim 16 wherein:
the apparatus further comprises an orientation sensor for determining the orientation of the camera relative to Earth; and the seamless panoramic image is transformed such that its orientation is generally aligned with Earth below and sky above.

* * * * *